United States Patent Office 3,706,776
Patented Dec. 19, 1972

3,706,776
PROCESS FOR THE MANUFACTURE OF VINYL TRICHLOROSILANE
Claus-Dietrich Seiler, Rheinfelden, Hans-Joachim Vahlensieck, Wehr, and Kurt Boje, Rheinfelden, Germany, assignors to Dynamit Nobel Aktiengesellschaft, Troisdorf, Germany
No Drawing. Filed Jan. 6, 1971, Ser. No. 104,523
Claims priority, application Germany, Jan. 20, 1970,
P 20 02 258.6
Int. Cl. C07f 7/14
U.S. Cl. 260—448.2 E       4 Claims

ABSTRACT OF THE DISCLOSURE

Improved process for producing vinyl trichlorosilane by reacting vinyl chloride and trichlorosilane under substantially anhydrous conditions at about 680 to 850° C. using a residence time of about 0.2 to 1.8 seconds.

---

This invention relates to the production of vinyl trichlorosilane. It more particularly refers to a novel, improved process for producing this compound.

It is in the prior art to manufacture vinyl trichlorosilane by reacting trichlorosilane with acetylene or by reacting trichlorosilane with vinyl chloride in the gas phase. Since the procedure using acetylene necessitates relatively great expenditure on safety measures, this process has not acquired extensive industrial use.

More suitable for industrial application is the process of reacting trichlorosilane with vinyl chloride in the gas phase. If a mixture of vinyl chloride and hydrogen chlorosilanes is passed through ceramic or metal tubes at temperatures of 550 to 650° C. and detention times greater than 2 seconds, preferably 5 to 20 seconds, there are produced a mixture of vinyl chlorosilanes. Where trichlorosilane is used as the hydrogen chlorosilane, its reaction with vinyl chloride under the conditions set forth above, a yield of only 53 mole-percent is achieved, with reference to the vinyl chloride reactant, which is the reactant used in a stoichiometric deficiency.

The ratio of the reactants to one another is said in the prior art to be of no particular importance insofar as yield data are concerned. According to the prior art, practical yields, that is yields up to the 53% stated above have not been achieved at reaction temperatures above 650° C. The prior art has laid the blame for these less than spectacular yields upon an alleged great decomposition as well as transpositions resulting in undesired by-products such as silicon tetrachloride and methyl trichlorosilane.

It is an object of this invention to provide an improved process for producing vinyl trichlorosilane.

It is another object of this invention to provide such an improved process which gives greater yields of the desired product than the prior art.

Other and additional objects of this invention will become apparent from a consideration of this entire specification and the claims included hereof.

In accord with and fulfilling these objects, one aspect of this invention lies in an improved process of producing vinyl trichlorosilane by reacting vinyl chloride and trichlorosilane at higher temperatures than in the prior art, that is 680 to 850° C., in a substantially anhydrous system for residence times of about 0.2 to 1.8 seconds. It is preferred to carry out the reaction at about 700 to 730° C. for a contact, or residence time of preferably 1 to 1.6 seconds.

It will be noted that these conditions of reaction are substantially contrary to the reaction parameters defined in the prior art.

It has been found that, if the above conditions are met, the yields increase greatly in comparison to yields obtained within the known process parameters and the formation of by-products is greatly suppressed. The special advantage of the new process, namely the application of higher temperatures, shorter detention times and anhydrous conditions, consists in the fact that the danger of coking present because of the use of longer residence or contact times is substantially completely eliminated and substantially higher yields of vinyl trichlorosilane are obtained.

The reaction is preferably performed at normal, atmospheric pressure. A small overpressure of up to 2 atmospheres gauge pressure or a small vacuum will not particularly affect the conversion and/or the yield.

The reactants are preferably fed to the process in batch or continuous manner in stoichiometric quantities. Any excess of one or the other of the reactants is reasonable provided such excess if any is within economical limits.

As already stated, the reaction is carried out under substantially anhydrous conditions. If the vinyl chloride reactant is moist, it should be dried prior to being fed to the reaction, to the lowest possible moisture content for the achievement of high yields.

The reaction is performed preferably in tubular reactors. Suitable reactor materials are metals, especially those which cause no decomposition or transposition of the starting products and end product, such as iron, ceramic, graphite and other such materials, substantially inert materials may also be used for the reactor.

The vinyl trichlorosilane manufactured according to the invention is a valuable product which is used in dressing materials containing silicates.

The process of the present invention is illustrated by the following examples:

EXAMPLES 1a TO 2a

Dry vinyl chloride and trichlorosilane were first mixed together in quantity ratios listed in the table below, and preheated to about 100° C.; they were then introduced into an iron pipe 150 cm. long with an inside diameter of 35 mm., at various velocities, and heated to the temperatures stated in the table. The products emerging from the reaction tube were cooled and condensed. The condensate obtained was tested qualitatively and quantitatively by distillation and gas chromatography. The results obtained are also shown in the table.

TABLE

| Example | Input of starting materials | | Average detention time (in sec.) | Temperature (in ° C.) | Transformation to vinyl trichlorosilane (in mole percent) | Trichlorosilane recovery (in mole percent) | Yield of vinyl trichlorosilane as percent of the reacted trichlorosilane |
|---|---|---|---|---|---|---|---|
| | Trichlorosilane (in moles) | Vinyl chloride (in moles) | | | | | |
| 1a | 145 | 176 | 1.75 | 650 | 49 | 45 | 88.0 |
| 1b | 145 | 176 | 1.75 | 720 | 69 | 19 | 85.2 |
| 1c | 145 | 176 | 1.75 | 750 | 59 | 19 | 72.9 |
| 2a | 186 | 228 | 1.35 | 650 | 39 | 58 | 92.9 |
| 2b | 186 | 228 | 1.35 | 720 | 85 | 13 | 98 |
| 2c | 186 | 228 | 1.35 | 750 | 74 | 15 | 87.1 |

What is claimed is:

1. In the process for the manufacture of vinyl trichlorosilane by reacting trichlorosilane and vinyl chloride at elevated temperature; the improvement which comprises carrying out the reaction under substantially anhydrous conditions at a temperature of 680 to 850° C., and an average contact time of 0.2 to 1.8 seconds.

2. Improved process claimed in claim 1, wherein the reaction is carried out in a tubular reaction zone of iron, ceramic, or graphite.

3. Improved process claimed in claim 1, wherein the reaction temperature is about 700 to 730° C. and wherein the average contact time is 1.0 to 1.6 seconds.

4. Improved process claimed in claim 1 wherein the reaction temperature is about 700 to 730° C.

References Cited

UNITED STATES PATENTS

| 2,770,634 | 11/1956 | Weyenberg | 260—448.2 E |
| 2,469,355 | 5/1949 | Holland et al. | 260—448.2 E |
| 2,510,853 | 6/1950 | Barry et al. | 260—448.2 E |
| 2,759,960 | 8/1956 | Nishikawa et al. | 260—448.2 E |

JAMES E. POER, Primary Examiner

P. F. SHAVER, Assistant Examiner

U.S. Cl. X.R.

260—448.2 Q